No. 813,792. PATENTED FEB. 27, 1906.
S. W. GOOCH & W. C. LEASURE.
HOSE COUPLING.
APPLICATION FILED MAR. 6, 1905.
2 SHEETS—SHEET 1.
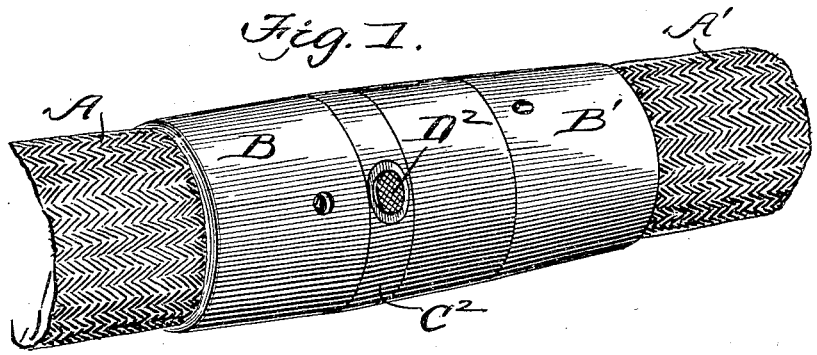
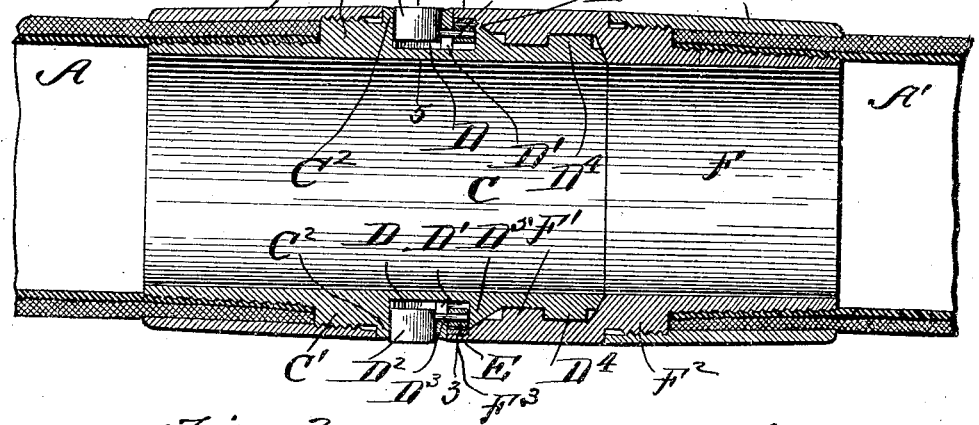
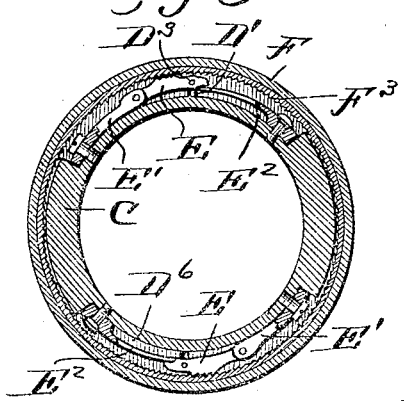 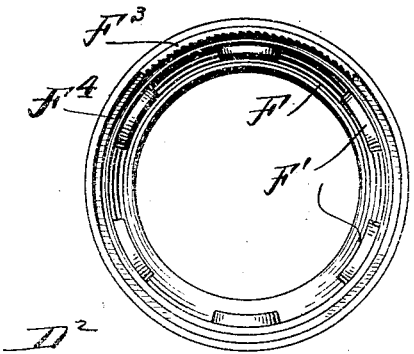
WITNESSES:
INVENTORS
S. W. Gooch,
W. C. Leasure,
BY
Brock
ATTORNEYS No. 813,792.       PATENTED FEB. 27, 1906.
S. W. GOOCH & W. C. LEASURE.
HOSE COUPLING.
APPLICATION FILED MAR. 6, 1905.
2 SHEETS—SHEET 2.
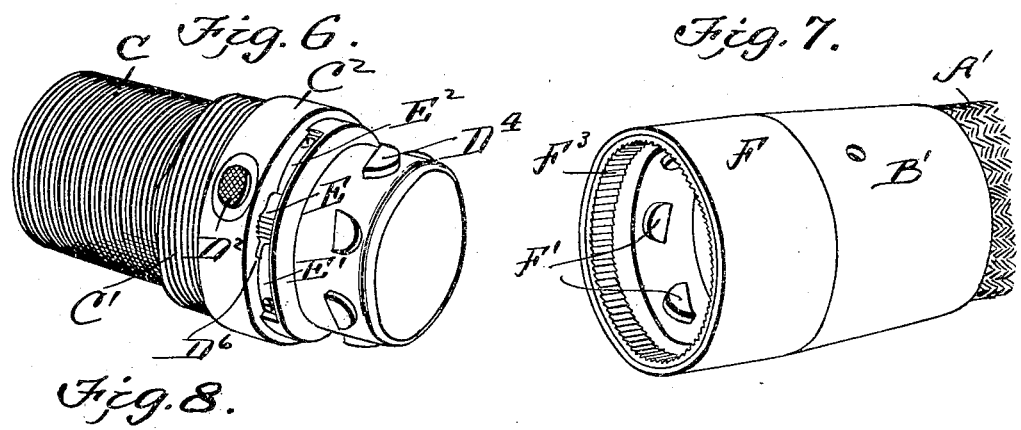
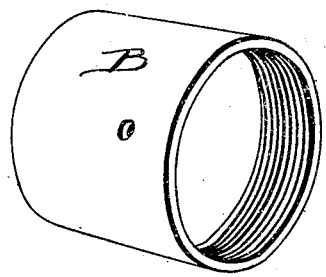
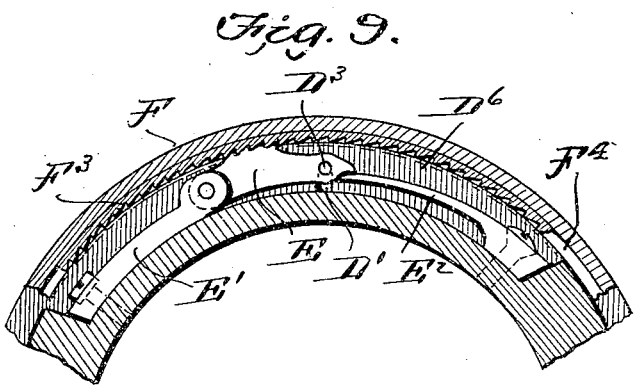
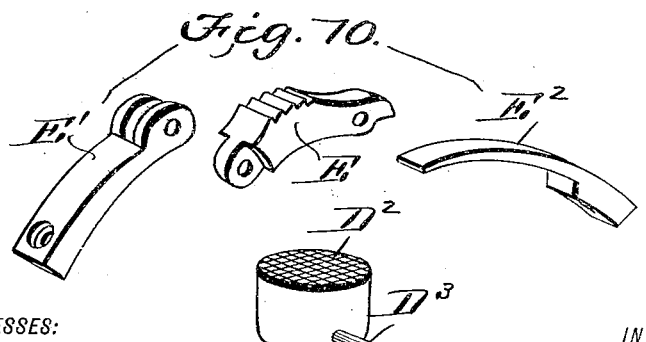
WITNESSES:
M. S. Blondel
E. B. McBath
INVENTORS
S. W. Gooch.
W. C. Leasure.
BY
O'Meara & Brock
ATTORNEYS

UNITED STATES PATENT OFFICE.

SHADRACK W. GOOCH, OF BRIDGEPORT, OHIO, AND WILLIAM C. LEASURE, OF WHEELING, WEST VIRGINIA.

HOSE-COUPLING.

No. 813,792.   Specification of Letters Patent.   Patented Feb. 27, 1906.

Application filed March 6, 1905. Serial No. 248,746.

*To all whom it may concern:*

Be it known that we, SHADRACK W. GOOCH, of Bridgeport, in the county of Belmont and State of Ohio, and WILLIAM C. LEASURE, of Wheeling, in the county of Ohio and State of West Virginia, citizens of the United States, have invented a new and useful Improvement in Hose-Couplings, of which the following is a specification.

This invention is an improvement on the hose-coupling for which Letters Patent No. 782,555 were granted to S. W. Gooch under date of February 14, 1905.

This invention consists in certain novel features of securing the hose to the coupling members and for locking the said members in position when in engagement with each other.

In the accompanying drawings, Figure 1 is a perspective view showing our coupling, the two sections of hose being coupled. Fig. 2 is a longitudinal section through the device, the parts being coupled and locked in position. Fig. 3 is a section on the line 3 3 of Fig. 2. Fig. 4 is an end view of one of the coupling members. Fig. 5 is a detail section on the line 5 5 of Fig. 2. Fig. 6 is a perspective vew showing one coupler member. Fig. 7 is a perspective view of the coupler member adapted to coact with the member shown in Fig. 6. Fig. 8 is a perspective view of a sleeve. Fig. 9 is an enlarged sectional view of the upper portion of Fig. 3. Fig. 10 is a perspective vew of the fastening and unlocking means, the various parts being shown detached.

In the drawings, A and A' represent sections of a hose to the end portions of which are secured sleeves B and B', respectively, which project beyond the hose-sections and are interiorly threaded adjacent their outer ends. Into the hose-section A is forced the inner end portion of a coupling member C, which intermediate its ends is provided with an annular shoulder C', the said shoulder being threaded, as is also the coupling member, to the rear of the shoulder. The outer end of the shoulder C' terminates in a flange $C^2$ of some thickness and having a smooth periphery, and when the coupling member C is in position in the pipe-section A and the sleeve B is in place the outer end of the sleeve bears on the flange $C^2$, the threaded shoulder C' engaging the interior threads of the sleeve, while the outer face of the sleeve is substantially flush with the periphery of the flange $C^2$, thus forming a smooth connection, the parts having the same exterior diameter. The flange $C^2$ is recessed, as shown at D, at diametrically opposite points, and a bore D', formed in the front wall of each of these recesses, opens in the outer face of the flange into a groove $D^6$, one of these grooves being formed in the periphery of the coupling member C adjacent each recess D and extending circumferentially around the coupling member. A movable push-button $D^2$ rests in each recess D, and each button carries a pin $D^3$, which projects through and moves in the bore D', having a movement to and away from the axis of the coupling member.

In the grooves $D^6$, whose outer walls form a shoulder $D^5$, are mounted pawls or locking members E, having an outer serrated edge. These pawls are pivoted between a bifurcated end portion of members E', which are secured by screws in the recesses and can therefore be readily removed for repair. The free end of each pawl is engaged by the adjacent pin $D^3$, the outer end of which rests in a perforation in the pawl, and the pawl is normally pressed outwardly by a spring $E^2$, shown in the drawings as a leaf-spring.

On the exterior of the coupling member C and in advance of the shoulder $D^5$ are arranged circumferentially and spaced apart lugs $D^4$, corresponding to the lugs B' shown in the patent above referred to.

A coacting coupler member F is preferably of less length than the coupler member C and is provided on its inner face with lugs F'; adapted to coact with the lugs $D^4$, said lugs interlocking, as described in the Letters Patent No. 782,555. Within the coupling member F we place toothed metal band $F^3$, serrated and adapted to be engaged by the serrated edge of the pawls E. This band may be continuous or formed in sections and is partly broken away in Figs. 4 and 9 to show in elevation a shoulder $F^4$, against which it bears.

In coupling a coupling member is grasped in each hand and the buttons $D^2$ are pressed inwardly by the fingers of the hand grasping the coupling member C. The lugs F' of the member F are passed between the lugs $D^4$ and the member F rotated so as to interlock the lugs. Pressure on the buttons $D^2$ is removed, and the springs E² lift the pawls E outwardly into engagement with the teeth of the band F³ and lock the coupler members against further rotation with respect to each other. To unlock the coupling members, the above-described operation is reversed.

Having thus fully described our coupling members, what we desire to secure by Letters Patent is—

1. The combination with coacting coupler members, of a serrated band carried interiorly by one of said members, a spring-actuated pawl carried by the second member and adapted to engage the band, radially-movable buttons carried by the second member, and pins carried by the buttons and adapted to move the said pawl.

2. The combination with coacting coupler members, one of said members having an interior band of teeth, the other member being recessed and circumferentially grooved adjacent the recesses, pawls pivotally mounted in the grooves, springs adapted to force the pawls outwardly into engagement with the teeth of the first-mentioned member, buttons movable radially in the recesses and pins carried by the buttons and in engagement with the pawls.

3. The combination with coupling members having interlocking lugs, teeth carried on the interior of one member, the other member being recessed and grooved at diametrically opposite points, pawls pivotally mounted in the grooves, springs arranged in the grooves and adapted to force the pawls outwardly, buttons movable inwardly and outwardly in the recesses, and pins carried by the buttons and secured to the pawls, as and for the purpose set forth.

SHADRACK W. GOOCH.
WILLIAM C. LEASURE.

Witnesses:
   FRED A. HARPFER, Jr.,
   LEROY C. LEASURE.